J. A. HODAM.
SPRING TIRE.
APPLICATION FILED AUG. 24, 1915.
1,219,555.
Patented Mar. 20, 1917.
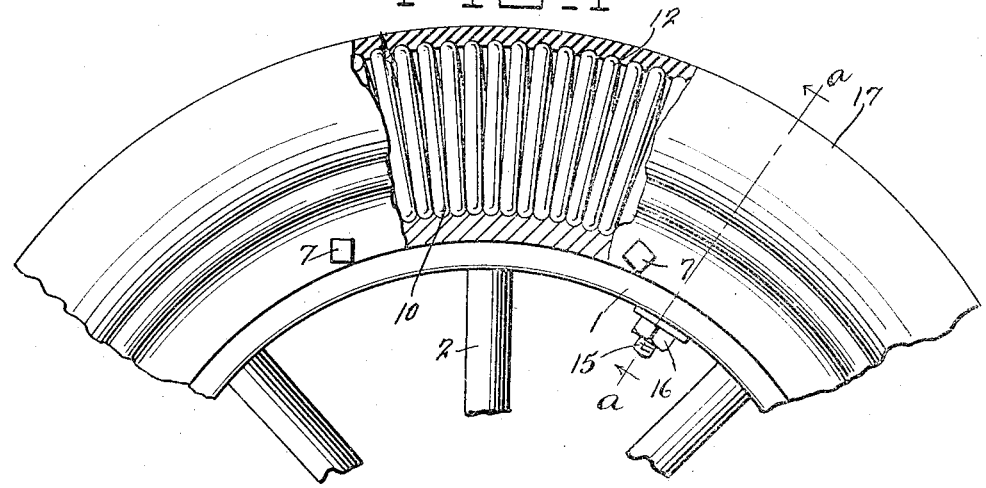
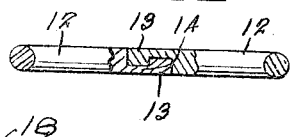
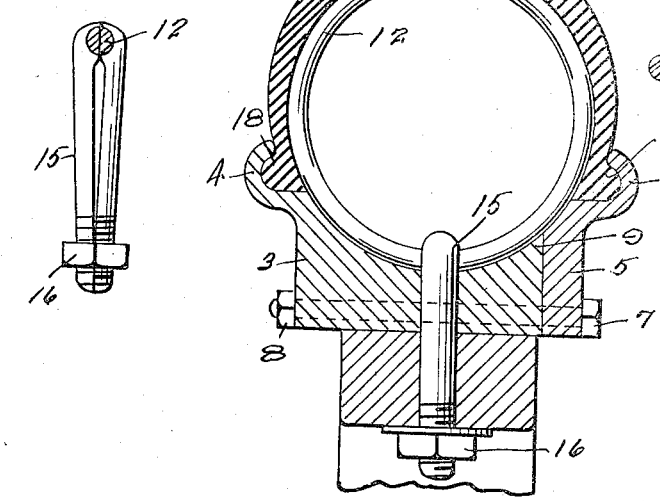
Witnesses
Chas. H. Trotter.
James J. Donegan
Inventor
J. A. Hodam
By ............ Attorney

UNITED STATES PATENT OFFICE.

JOSEPH A. HODAM, OF LINCOLN, NEBRASKA.

SPRING-TIRE.

1,219,555.  Specification of Letters Patent.  Patented Mar. 20, 1917.

Application filed August 24, 1915. Serial No. 47,175.

*To all whom it may concern:*

Be it known that I, JOSEPH A. HODAM, a citizen of the United States, residing at Lincoln, in the county of Lancaster and State of Nebraska, have invented certain new and useful Improvements in Spring-Tires; and I do hereby declare the following to be a full, clear, and exact description of the invention, such as will enable others skilled in the art to which it appertains to make and use the same.

The general object of this invention is to improve the construction of spring tires of the type wherein a helical spring is incased in a rubber or leather shoe, whereby the spring will be prevented from creeping within the shoe; also to provide a tire which can be cheaply constructed and will be durable and can be conveniently and quickly applied to the wheel rim, and when so applied will give the same resiliency as a pneumatic tire.

Broadly, the invention contemplates the provision of a rim adapted for attachment to the felly of the vehicle wheel, and the outer surface provided with a channel, which is adapted to receive the inner portions of the coils of the helical spring, the inner surface of the channel being provided with transverse grooves of a desired width and depth to receive the coils and in this manner prevent the spring from creeping within the tire, the opposite ends of the spring being adapted, when said spring is in operative position, to have connection with each other, a clamping bolt extending through the wheel felly and rim and having connection with the spring at the point of connection between the ends thereof so as to prevent the accidental disconnection of the ends and also to provide an additional means for preventing creeping of the spring.

With the above and other objects in view as will more fully appear from that embodiment of my invention of which the following is a specification, reference being had to the accompanying drawings forming a part thereof, in which:

Figure 1 is a detail side elevation of the vehicle wheel having a portion of the outer casing or the shoe partly broken away to show the inner spring.

Fig. 2 is a cross section taken on the line *a—a* of Fig. 1.

Fig. 3 is a detail showing the manner of connecting the ends of the spring.

Fig. 4 is a side elevation of a clamping bolt for clamping the ends of the helical spring.

Referring more particularly to the drawings, the numeral 1 designates a vehicle wheel felly of the ordinary construction having spokes 2 secured thereto.

Mounted upon the felly 1 is a concentric rim 3 which has one side provided with a curved attaching flange 4, the other side being provided with a detachable sectional clamping ring 5 having its outer periphery provided with an attaching flange 6, the said ring 5 being secured to the rim 3 by means of transverse bolts 7 which are held in place by means of nuts 8. The outer surface of the rim 3 is provided with a circumferential channel 9, which is arcuate in transverse section, and has the inner surface thereof provided with a series of transverse grooves 10. Seated within the channel 9 in the rim 3 is a helical spring 12, the opposite ends of which are adapted to be connected to each other by means of a tongue and groove joint 13 and 14 as shown in Fig. 3 of the drawing. When the spring is positioned upon the rim 3, the inner portions of the coils thereof are received within the transverse grooves 10 whereby the spring is held in place and prevented from creeping around the rim 3.

Extending through the felly 1 of the vehicle wheel and through the rim 3 is a bolt 15. This bolt is formed of companion clamping sections, the outer ends of which are adapted to clamp therebetween the connected ends of the helical spring, the opposite or inner ends of the sections being threaded for the accommodation of a nut 16. By virtue of the employment of the bolt 15 additional means is also provided to prevent the creeping of the spring around the rim and also the opposite ends of the spring will be prevented from accidental disconnection from each other.

The spring 12 is incased within a shoe 17, the longitudinal edges of the sides of the shoe having beads as shown at 18 to engage under the flanges 4 and 6 formed respectively on the rim 3 and the clamping ring 5.

From the above description it will be seen that I have provided a cheap, durable and efficient spring tire, which will give the same amount of resiliency as a pneumatic tire, and while the form of my invention illustrated in the drawings, and referred to in the above description as the preferred embodiment, I desire to emphasize the fact that various minor changes in details of construction, proportion and arrangement of parts may be resorted to, when required, without sacrificing any of the advantages of my invention, as defined in the appended claim.

What is claimed is:—

The combination with a vehicle wheel, of a rim secured on the felly of the wheel and having a channel therein, a spring arranged within said channel having its opposite ends separable and interlocked, and a bolt formed of companion clamping sections extending through the felly and said rim, the inner ends of said clamping sections of said bolt being threaded, and a nut fitted on said threaded sections and engaging said felly and the opposite ends of said clamping sections engaging the spring at the point of connection between the ends of the spring to retain the ends of said spring in interlocked position.

In testimony whereof I affix my signature in presence of two witnesses.

JOSEPH A. HODAM.

Witnesses:
E. H. FLETCHER,
F. E. EDGERTON.

Copies of this patent may be obtained for five cents each, by addressing the "Commissioner of Patents Washington, D. C."